United States Patent [19]

Doering

[11] Patent Number: 4,897,134
[45] Date of Patent: Jan. 30, 1990

[54] ULTRASONIC WELDING HUBS TO MAGNETIC RECORDING DISKETTES

[75] Inventor: Arlin B. Doering, St. Paul, Minn.

[73] Assignee: Minnesota Mining and Manufacturing Company, St. Paul, Minn.

[21] Appl. No.: 258,040

[22] Filed: Oct. 14, 1988

Related U.S. Application Data

[62] Division of Ser. No. 823,190, Jan. 27, 1986, Pat. No. 4,797,764.

[51] Int. Cl.$^4$ .......................... B29C 65/08; G11B 5/82
[52] U.S. Cl. .................................. 156/73.1; 156/295; 156/309.6; 346/137; 360/135
[58] Field of Search ................. 156/73.1, 580.1, 580.2, 156/295, 309.6; 360/135; 346/137

[56] References Cited

U.S. PATENT DOCUMENTS

| | | | |
|---|---|---|---|
| 3,689,334 | 9/1972 | Dermody | 156/73 |
| 3,727,619 | 4/1973 | Kuris | 132/56 |
| 4,265,688 | 5/1981 | Gorski | 156/73.1 |
| 4,445,157 | 4/1984 | Takahashi | 360/133 |
| 4,470,083 | 9/1984 | Doering et al. | 360/97 |
| 4,480,282 | 10/1984 | Brock et al. | 360/135 |
| 4,544,977 | 10/1985 | Ozawa et al. | 360/133 |
| 4,549,922 | 10/1985 | Oishi et al. | 360/135 |
| 4,609,964 | 9/1986 | Sobel | 360/135 |
| 4,631,685 | 12/1986 | Peter | 156/73.1 |
| 4,694,370 | 9/1987 | Ommori et al. | 360/135 |
| 4,698,715 | 10/1987 | Oishi | 360/133 |
| 4,785,444 | 11/1988 | Nakane et al. | 360/135 |
| 4,788,615 | 11/1988 | Oishi | 360/135 |

FOREIGN PATENT DOCUMENTS

| | | | |
|---|---|---|---|
| 60-109031 | 6/1985 | Japan | |
| 60-131631 | 7/1985 | Japan | 360/135 |
| 60-239224 | 11/1985 | Japan | 156/73.1 |

Primary Examiner—Michael Wityshyn
Attorney, Agent, or Firm—Donald M. Sell; Walter N. Kirn; Douglas B. Little

[57] ABSTRACT

A magnetic recording medium disk with substantially improved tolerances comprising:
a hub including a center portion and recessed flange portion, the center portion having a planar drive surface; magnetic medium, including a side zero and a side one; and an adhesive bonding the side one of the medium to the flange of the hub, wherein the side zero of the medium is fixed a precise, desired distance $\alpha$ from the plane of the drive surface and the total indicated runout of the hub used divided by the total indicated runout of the distance $\alpha$ is greater than one. A method and apparatus for manufacturing a magnetic recording medium disk with substantially improved tolerances by applying ultrasonic vibrations to the medium and a hot melt adhesive until the precise desired distance $\alpha$ is achieved.

5 Claims, 3 Drawing Sheets

ULTRASONIC WELDING HUBS TO MAGNETIC RECORDING DISKETTES

TECHNICAL FIELD

This invention is in the field of magnetic recording media disks, particularly magnetic recording media disks having hubs. The recording medium is generally an annular ring made of flexible magnetic sheet material. In the case of disks with hubs, the medium is mounted on a circular hub to form the disk. The disk is contained in a case or cartridge and is known by various designations such as micro diskette, micro-floppy disk (MFD), floppy disk, or compact floppy disk.

BACKGROUND

Magnetic recording media disks having hubs (hereinafter hubbed disks) generally consist of three elements: a flexible magnetic recording medium, a flanged metal hub, and an adhesive which secures the medium to the flange of the hub.

The medium is an annular ring made of flexible magnetic sheet material having a thickness of approximately 0.075 mm. The hubs used in hubbed disks may be stamped from a metal sheet or molded from a thermoplastic with a magnetic insert. The hub has a center portion and a recessed flange portion. The center portion fits through the central aperture in the medium, the medium resting on the flange portion, with an adhesive therebetween bonding the medium to the flange.

The distance between the top surface of the medium and the plane of the top of the central portion of the hub must be precisely controlled in order for the head of the digital recording and reproducing equipment to accurately read and record on the medium. This distance will hereinafter be referred to as the distance $\alpha$. The present proposed industry standard for the distance $\alpha$ is 1.36 mm±0.10 mm (American National Standards Institute—European Computer Manufacturers Association/International Standards Organization, hereinafter ANSI-ECMA/ISO, proposed standard). This relatively large allowable deviation for $\alpha$ is insufficient for optimal head performance, but present manufacturing techniques have been unable to improve upon this tolerance.

The predominant method for the manufacture of hubbed disks is to place a ring of polymer film with a pressure sensitive adhesive coated to both sides, between the medium and hub to secure the medium to the hub. Other types of adhesives may also be used to bond the medium to the hub.

The tolerance of $\alpha$ is determined by three components: the tolerances of the hub, the adhesive ring, and the process of assembling the disk. Thus, imperfections in the hub, plus imperfections in the adhesive, plus imperfections in the assembly process are additive and all contribute to the currently allowable±0.10 mm.

The deviations in $\alpha$ can be quantified in two ways. The difference between the maximum and minimum excursion of $\alpha$ is known in the industry as the total indicated runout ($\alpha$ T.I.R.). The $\alpha$ T.I.R. has three components; hub T.I.R., adhesive T.I.R. and assembly T.I.R. If the $\alpha$T.I.R. were exactly that of the hub T.I.R. (I.e. total $\alpha$ tolerance completely due to deviations in the hub) then dividing the $\alpha$ T.I.R. into the hub T.I.R. would result in a quotient of one. If adhesive and assembly were responsible for additional variance, then the quotient would be less than one. Contrarily, if the adhesive and assembly technique improved the $\alpha$ T.I.R. relative to the hub T.I.R., then the quotient would be greater than one. Hub T.I.R./$\alpha$ T.I.R. is hereinafter referred to as T.I.R. ratio. This problem is especially prevalent because of the extreme price competition in this market. With increased cost cutting comes greater deviations in hubs, adhesive and assembly.

Unlike the prior techniques for producing hubbed disks the present invention results in a final product with less deviation than the hub used. The $\alpha$ T.I.R. of hubbed disks produced under the present invention is actually less than the T.I.R. of the hub used to produce the hubbed disk. Thus, the T.I.R. ratio, hub T.I.R./$\alpha$ T.I.R. will be greater than one.

DISCLOSURE OF THE INVENTION

This invention presents a new magnetic recording medium disk with substantially improved $\alpha$ tolerance and with a T.I.R. ratio greater than one comprising:

a hub, including a center portion and a flange portion, the center portion having a planar drive surface;

a magnetic medium including, a side zero, and a side one; and an adhesive bonding side one of the medium to the flange of the hub, wherein the side zero of the medium is fixed a distance $\alpha$ from the plane of the drive surface and the hub T.I.R./$\alpha$ T.I.R is greater than one.

This invention also presents a method for manufacturing the new magnetic recording medium disk having substantially improved $\alpha$ tolerance and a T.I.R. ratio greater than one, the method comprising:

providing a hub including a center portion and a flange portion, said center portion having a planar drive surface;

providing a thermoplastic adhesive on the flange of the hub;

allowing the adhesive ring to cool;

providing a magnetic medium having a side zero and a side one;

resting said side one of said medium on the adhesive;

applying pressure and ultrasonic vibrations to the magnetic medium and adhesive; maintaining the pressure and ultrasonic vibrations for a time necessary to melt the adhesive and achieve a desired distance, $\alpha$, between the side zero of the medium and the plane of the drive surface; and preferably the adhesive is provided on the flange of the hub by first placing the adhesive there then applying sufficient heat to the hub to melt the adhesive so that the adhesive becomes bonded to the flange and also to cause the adhesive to bead.

The invention further presents an apparatus for carrying out the method for manufacturing a magnetic recording medium disk having substantially improved $\alpha$ tolerance and a T.I.R. ratio greater than one the apparatus comprising:

an ultrasonic horn, including an outer annular surface and an inner surface, the inner surface recessed a distance equal to the desired distance $\alpha$;

an anvil adapted to support the hub;

a hub support, with a circular horizontal cross section, including an anvil opening adapted to receive the anvil;

a base;

the anvil fixedly mounted to the base; the hub support being vertically movably mounted to the base in a concentric relationship to the anvil;

the ultrasonic horn being mounted in alignment with the anvil;

means coupled to the horn for causing the ultrasonic vibrations thereof;

Instead of an ultrasonic horn, it is possible to utilize a forming mandril including an outer annular surface and an inner surface, the inner surface recessed a distance equal to the desired distance $\alpha$. The forming mandril is mounted in alignment with the anvil such that pressure can be exerted on a hub placed on the anvil.

In use, a hub is placed on the anvil and an adhesive is applied to the flange of the hub. Adhesives such as silicones, epoxies, acrylates and cyanoacrylates and others may be used. The adhesive chosen must have a sufficiently high viscosity so it does not run off the edges of the hub during the process.

A medium is placed on the hub, the side one resting on the adhesive. The outer annular surface of the forming mandril applies pressure to the side zero of the medium until the inner surface contacts the planar drive surface of the hub. When contact is made the side zero of the medium is the desired distance $\alpha$ from the drive surface of the hub. This position is held until the adhesive is set.

Transfer of energy to the adhesive may be accomplished through many methods known in the art including Rf energy, electron-beam, or microwaves. The method of the preferred embodiment is desirable because of very rapid heating and setting of the adhesive. Other adhesive systems have hold times of five minutes or more, making them less practical for commercial use.

If pressure is applied by the forming mandril and held at the desired $\alpha$ distance until the adhesive has set, disks with the desired T.I.R.'s and T.I.R. ratios may be formed.

DETAILED DESCRIPTION

Figure 1:
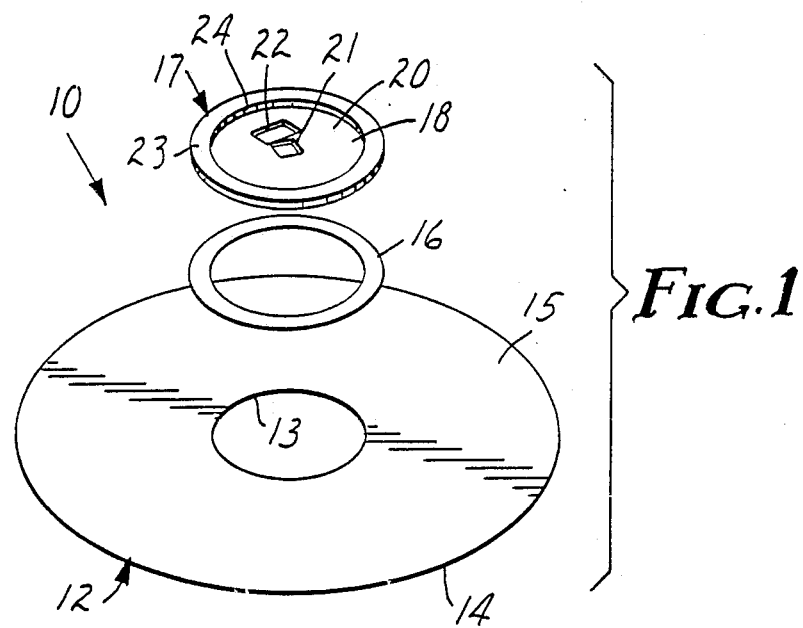
FIG. 1 is an exploded view of the disk of this invention.

Referring to the figures, FIG. 1 shows the basic elements of a hubbed disk 10 in an exploded view:
a magnetic medium 12,
an adhesive 16, and
a hub 17.

Figure 4:
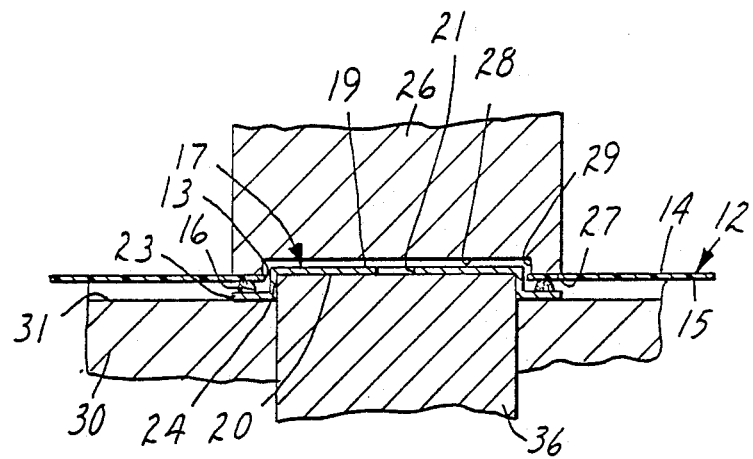
FIG. 4 is a partial cross-sectional view of the disk and the apparatus prior to the ultrasonic welding.
Figure 5:
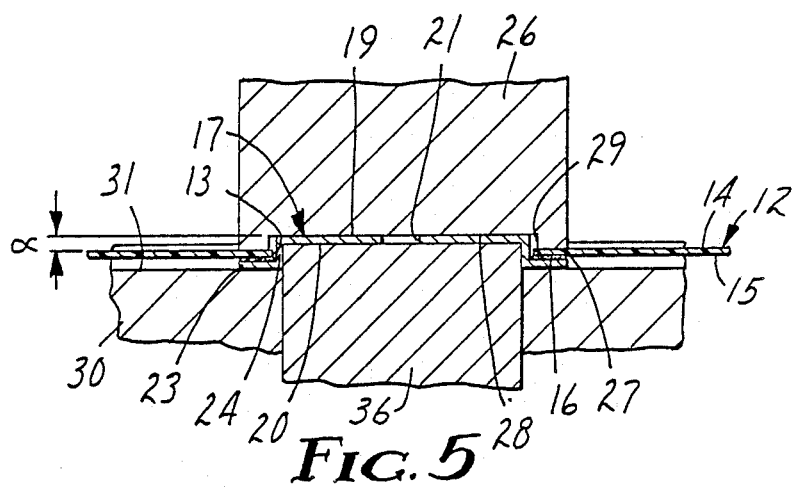
FIG. 5 is a partial cross-sectional view of the disk and the apparatus showing the ultrasonic horn in the shut-off position.

The magnetic medium 12 is an annular ring made of flexible magnetic sheet material which in many embodiments of the invention has a nominal thickness of 0.075 mm. The medium 12 has a central aperture 13, a side zero 14 and a side one 15. In FIG. 1, side zero 14 is on the bottom and side one 15 is on the top. In FIGS. 4 and 5, side zero 14 is on the top and side one 15 is on the bottom.

The adhesive 16 in many embodiments of the invention is an annular shaped ring of thermoplastic adhesive having a thickness of about 0.250 to about 0.375 mm. The adhesive 16 may be die cut from a sheet of thermoplastic adhesive having the desired thickness or applied directly to the hub from a dispenser. The adhesive used in the preferred embodimet of the present invention is a segmented polyester adhesive, described and claimed in U.S. Pat. No. 4,059,715, issued to Pletcher. A second preferred adhesive is a polyamide adhesive commercially available from Henkel as Micromelt 6238.

The hub 17 comprises a center portion 18 having a drive surface 19 and an anvil surface 20 and having a spindle aperture 21 and a drive aperture 22 formed therein. The hub 17 also has a recessed outer flange 23, and a side wall 24.

The drive surface 19 is adapted to contact a drive mechanism (not shown) in the reader/recorder device. (not shown) and the drive aperture 22 adapted to receive a drive peg (not shown). The anvil surface 20 is adapted to receive the anvil of the apparatus described below.

Figure 6:
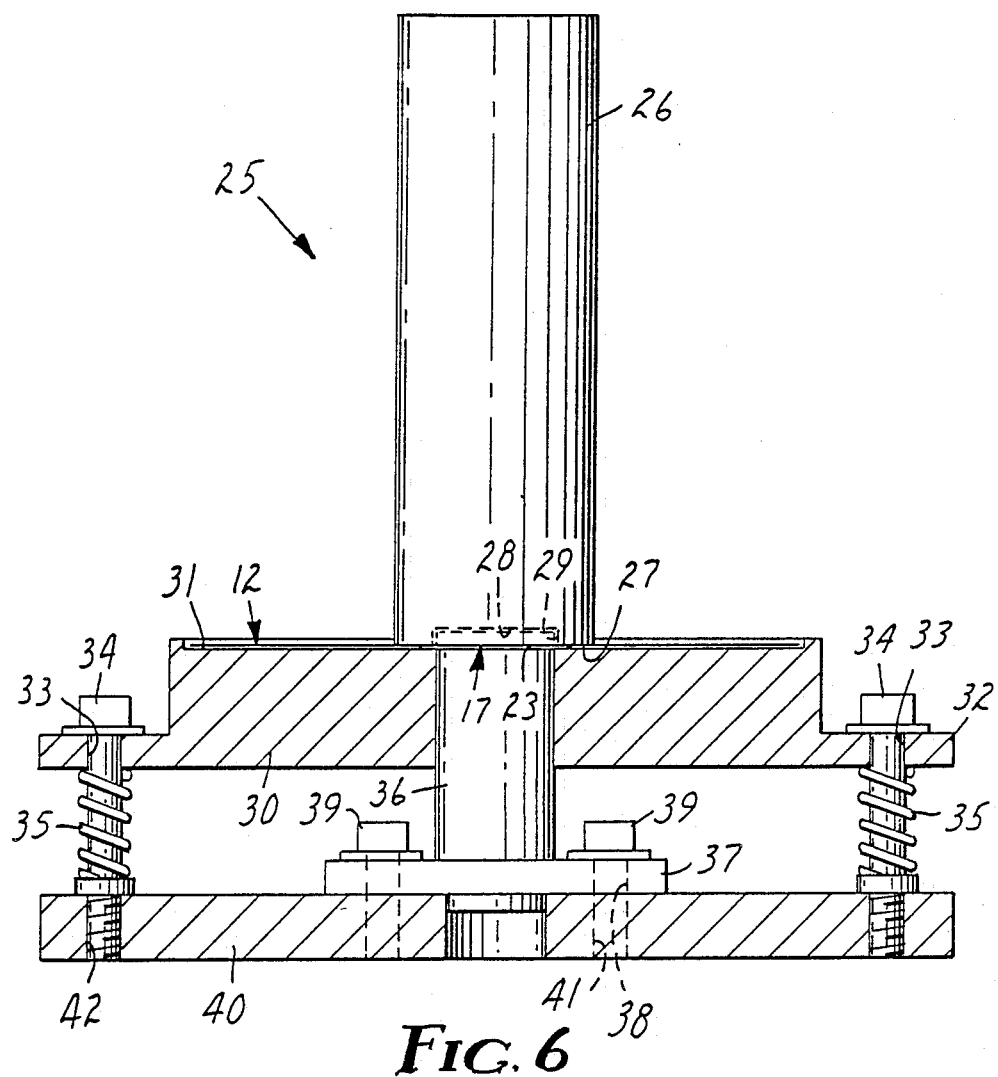
FIG. 6 is a cross-sectional view of the apparatus with some parts shown in elevation.

Referring to FIGS. 4 through 6, an ultrasonic apparatus, generally designated 25, is shown. A 40 Khz, 700 watt ultrasonic welder has been found to be the most successful in practicing this invention, for example the commercially available Branson #4AE actuator.

The apparatus 25 comprises a horn 26, a hub support 30, an anvil 36, and a base 40.

The horn 26 has an outer annular surface 27, an inner surface 28 and an inner $\alpha$ surface 29 lying vertically therebetween. The horn 26 is mounted in a vertically movable position above the anvil 36. Means for applying vertically downward pressure to the horn 26 is provided but not shown. Means for causing the horn 26 to vibrate ultrasonically is also provided but not shown. The anvil 36 has a circular horizontal cross-section and is adaptedd to contact the anvil surface 20 of the hub 17 as shown in FIG. 5. The hub support 30 also has a circular horizontal cross-section and is vertically movably mounted in a concentric relation to the fixedly mounted anvil 36.

Shut-off means for terminating the ultrasonic vibration of the horn 26 when the precise desired distance $\alpha$ is reached is provided but not shown. The inner $\alpha$ surface 29 has a height of the desired distance $\alpha$. Thus, as shown in FIG. 5, when the precise distance $\alpha$ is reached, the circuit is completed between the anvil 36 and the horn 26 and the vibrations are terminated by the shut-off means. The circuit can not be completed until the inner surface 28 contacts the drive surface 19 because the medium 12 and the adhesive 16 are electrical insulators.

As shown in FIG. 6, the anvil 36 has a flange 37 with a plurality of apertures 38 adapted to receive fasteners 39 to secure the anvil 36 to the base 40 which receives the fasteners 39 in a plurality of base anvil apertures 41.

The hub support 30 has a medium recess 31 adapted to receive the medium 12, and a hub support flange 32 with a plurality of apertures 33. The apertures 33 are adapted to received fasteners 34. Bias means 35 are positioned between the flange 37 and the base 40 such that the hub support 30 is movably mounted to said base 40 and urged vertically upward. The base 40 receives the fasteners 34 in a plurality of base hub support apertures 42. The hub support 30 is substantially more massive than the hub 17 to minimize the oscillations of the hub 17 during welding.

Figure 2:
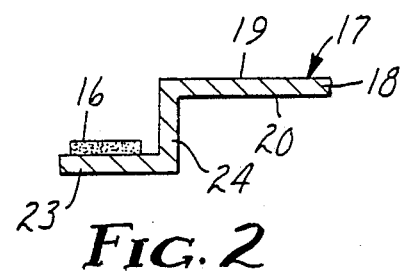
FIG. 2 is a partial cross-sectional view of the hub and a thermoplastic adhesive ring prior to applying heat to the hub.
Figure 3:
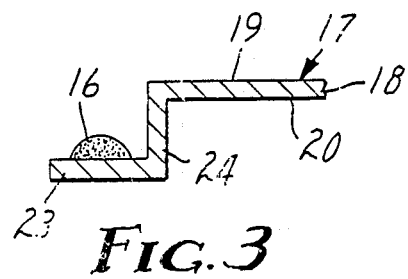
FIG. 3 is a partial cross-sectional view of the hub and the adhesive ring showing the beading of the thermoplastic adhesive after heating.

To assemble the hubbed disk 10 of the present invention, the adhesive 16 is placed on the outer flange 23 of the hub 17. When a polyester thermoplastic adhesive is used the hub 17 and the adhesive ring 16 may be heated at 120° C. to 170° C. for 1.0–2.0 minutes. This causes the adhesive to bond to the hub 17 and to bead as shown in FIGS. 2 and 3. The adhesive ring 16 and hub 17 are allowed to cool. The shape of the adhesive is now conducive to act as an energy director in the ultrasonic welding process described below.

Referring now to FIG. 4, the hub 17 and the beaded adhesive ring 16 bonded thereto are positioned on the apparatus 25 with the flange 23 in contact with the recess 31 and the anvil surface 20 in contact with the anvil 36. The medium is positioned in the medium recess 31 with side one 15 of the medium 12 positioned on the adhesive 16. The outer annular surface 27 of the horn 26 engages side zero 14 of the medium 12.

Pressure and ultrasonic vibration are applied to the medium 12 and the adhesive 16 using methods well known in the art. Ultrasonic vibrations travel to the media-adhesive interface, wherein they are dissipated in the form of frictional heat. The adhesive 16 melts, while the medium 12 does not distort. Ultrasonic vibrations and pressure are applied until physical contact is made between the inner surface 28 and the drive surface 19 and thus electrical contact is made between the anvil 36 and the horn 26 through the conductive metal central portion 18 of the hub 17. The height of the $\alpha$ surface 29 is the thickness of the desired distance $\alpha$. Thus, when the desired $\alpha$ is reached the contact between the inner surface 28 and the drive surface 19 completes the circuit with the shut off means (not shown) thereby terminating the ultrasonic vibrations. The horn 26 is then held in this position for a short time to allow the weld to solidify. This is known as hold time. Other parameters which may be varied to achieve desired results are the force of the horn, the amplitude of the horn, and the horn speed.

The parameters of a preferred embodiment are as follows:

Vertical Force of the horn: 160–215 N
Amplitude of oscillations of horn: 0.019–0.025 mm peak-to-peak
Horn speed: 4.0 cm/sec
Hold time: 0.7 sec.

The substantially improved distance $\alpha$ control and T.I.R. Ratio of the present invention can be demonstrated utilizing the quantitative techniques described above. Samples of four commercially available 1 megabyte (1 MB) hubbed disks were compared to samples prepared using the method and apparatus of the present invention. The results show that the products prepared according to the present invention achieved an average $\alpha$ T.I.R. of 0.026 mm with a standard deviation of 0.008. This is a substantial improvement over the four prior art samples and an even greater improvement over the 0.10 mm industry standard. Also, the present invention is the only sample with a T.I.R. ratio greater than 1.0. This indicates that the method and apparatus of the present invention actually improved the $\alpha$ T.I.R. relative to the deviation present in the hub used (hub T.I.R.). In the following table "n" refers to the number of samples tested; "AVE" refers to the average result for the samples tested; and "SD" refers to the standard deviation using known statistical methods. "T.I.R. Ratio" refers to $$\frac{\text{hub T.I.R.}}{\alpha \text{ T.I.R.}}$$

Samples one through four are available from four commercial sources.

| Type | n | AVE DISTANCE $\alpha$ mm AVE | SD | $\alpha$ TIR mm AVE | SD | TIR RATIO AVE | SD |
|---|---|---|---|---|---|---|---|
| Present Invention | 40 | 1.372 | .012 | 0.026 | 0.008 | 1.21 | .68 |
| Sample #1 | 73 | 1.373 | .011 | 0.044 | 0.013 | .92 | .43 |
| Sample #2 | 9 | 1.329 | .007 | 0.039 | 0.015 | .83 | .26 |
| Sample #3 | 10 | 1.389 | .015 | 0.049 | 0.020 | .77 | .35 |
| Sample #4 | 10 | 1.341 | .008 | 0.062 | 0.011 | .82 | .15 |

While certain representative embodiments and details have been discussed above for the purpose of illustrating the invention, it will be apparent to those skilled in this art that various changes and modifications may be made in this invention without departing from its true spirit or scope which is indicated by the following claims.

What is claimed is:

1. A method for ultrasonically welding a magnetic medium disk to a hub with a thermoplastic adhesive said method comprising;
    providing a hub including a center portion and a flange portion, said center portion having a planar drive surface;
    placing a thermoplastic adhesive on said flange portion of said hub;
    providing a magnetic medium disk having a central aperture and having a side zero and a side one;
    placing the hub at the central aperture and resting said side one of said disk on said adhesive;
    applying pressure and ultrasonic vibrations to said magnetic medium disk and adhesive;
    maintaining said pressure and ultrasonic vibrations for a time necessary to melt said adhesive and achieve a desired axial distance, $\alpha$, between said side zero of said disk and the plane of said drive surface, and
    maintaining the position of the hub and magnetic medium disk until the adhesive is set.

2. The method of claim 1 and further comprising applying sufficient heat to the hub to melt said thermoplastic adhesive such that said adhesive becomes bonded to said flange and causes said adhesive to bead.

3. The method of claim 2 wherein said pressure and ultrasonic vibrations are automatically terminated by shut-off means when the desired distance $\alpha$ is achieved.

4. The method of claim 1 wherein said thermoplastic adhesive is a polyester.

5. The method of claim 1 wherein the hub is made of metal.

* * * * *